Patented Mar. 5, 1929.

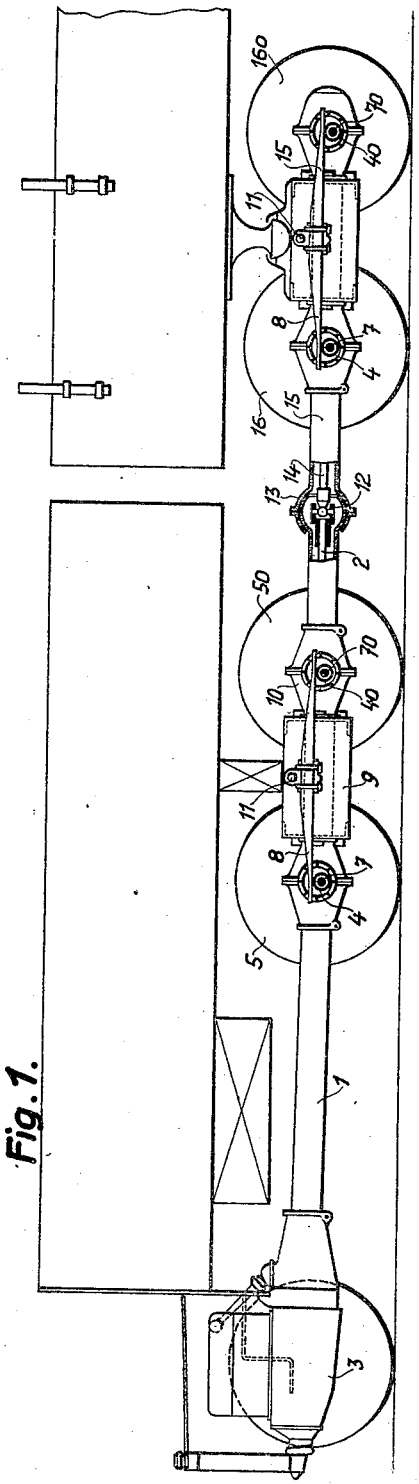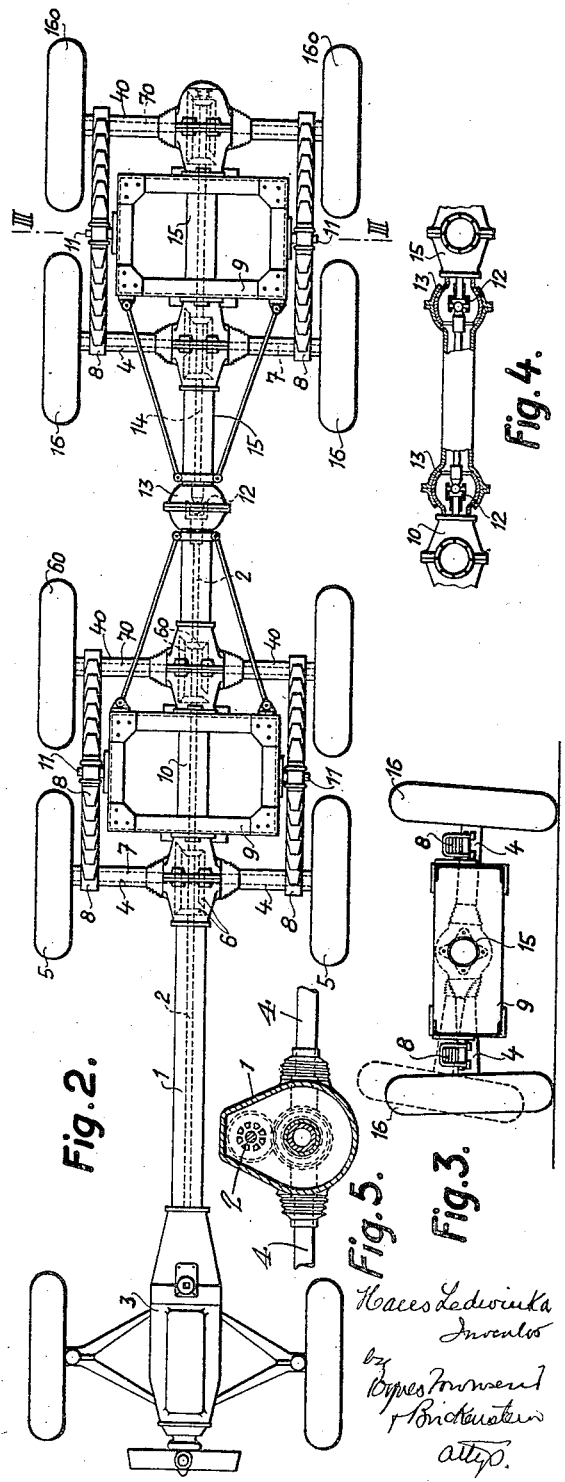

1,704,296

UNITED STATES PATENT OFFICE.

HANS LEDWINKA, OF KOPRIVNICE, CZECHOSLOVAKIA.

MOTOR VEHICLE.

Application filed April 13, 1926, Serial No. 101,510, and in Czechoslovakia February 7, 1925.

The present invention relates to motor vehicles having two or more pairs of driven rear wheels, which are driven by a common driving shaft prolonged up to the last pair of wheels. The hitherto known arrangements of this kind were only applicable to motor vehicles provided with frames and the driving of the wheel axles caused considerable losses of power, inasmuch as the parts of the common driving shaft corresponding to each wheel axle were connected with one another by means of joints. It is the object of the invention to eliminate these defects of the hitherto known constructions.

According to the invention it is rendered possible to employ two or more pairs of driven rear wheels even on motor vehicles having no frames by the use of a medial supporting member, an efficient and economical drive being obtained. For this purpose swivelling half-axles bearing the driven wheels and a medial supporting member are employed, the said member being prolonged as a rigid body for the reception of the further pair of wheels or further pairs of wheels and carrying in the prolonged part the jointless prolongation of the driving shaft which is arranged in known manner in said supporting member. This arrangement is rendered possible by the use of swivelling half-axles which render unnecessary the usual rotatable connection of the two differential or like gear boxes which lie behind one another, so that the part lying between these gear boxes can also be constructed as a rigid body.

In accordance further with the invention both the prolongation of the supporting member and that of the driving shaft terminate in a coupling joint with co-axial axes of rotation, whereby the connection of a trailer with driven wheel axles is rendered possible under the most favourable conditions both in respect of economical drive and light wear on the shaft joint.

One constructional form according to the invention is illustrated diagrammatically in the accompanying drawing, in which:

Fig. 1 shows a motor vehicle with a trailer in side elevation.

Fig. 2 shows the underneath framework of the vehicle in plan.

Fig. 3 shows a section on the line III—III of Fig. 2 and

Fig. 4 shows an alternative construction for the coupling joint between the vehicle and the trailer.

Fig. 5 shows in detail the type of swivelling half-axles used with this invention.

In Figs. 1 and 2 the rear part of the trailer has been omitted as it does not form a part of the invention and may be constructed as desired.

The motor vehicle is provided in known manner with a medial longitudinally arranged supporting member 1, within which a driving shaft 2 driven by the motor 3 runs. To the supporting body 1 are connected hollow swivelling or oscillating half axles 4 carrying the running wheels 5, which are driven by the shaft 2 through the medium of a transmission gear 6 or a differential gear and shafts 7. According to the invention the driving shaft 2 and the supporting member 1 are prolonged beyond the pair of wheels 5 (the prolongation being effected in the case of the supporting member by means of the part 10 rigidly attached to it) in such a manner that a further pair of running wheels 50 may be connected to the part 10, said wheels being mounted on swivelling or oscillating half axles 40 and being driven by the prolonged driving shaft 2 through the medium of a bevel wheel gear 60 or a differential gear and shafts 70. Springs 8 pivotally mounted on pins 11 on the frame 9 are arranged so as to rest on the axles 4, 40 of the two pairs of wheels 5, 50. This arrangement of two longitudinally spaced axles with driven wheels and frame 9 constitutes in effect a complete truck or bogie for the vehicle.

A further prolongation of the shaft 2 and the supporting member 1, 10 may be provided for the attachment of further pairs of driven or, if desired, of non-driven half-axles.

According to a further development of the invention the shaft 2 terminates in a coupling joint 12 and the supporting member 10 terminates in one half of a ball joint 13 arranged concentrically with the coupling joint 12 for the purpose of connecting the shaft 14 and the supporting member 15 of a trailer, the pairs of wheels 16, 160 of which are also driven by the prolonged shaft 14 and are connected by their swivelling half-axles 4, 40 to the prolonged supporting member 15.

In place of a trailer a bogie may be employed, which has its supporting member connected in a similar manner to the supporting member 1, 10 of the motor vehicle and is driven by the prolonged shaft 2 of the latter. Either the trailer or the bogie may be provided with two or more pairs of driven swivelling half-axles.

For the connection of a bogie or a trailer either a coupling joint 12, 13 (Fig. 1) or two coupling joints constructed in similar manner and arranged one behind the other (Fig. 4) may be used.

I claim:

1. In a motor vehicle of the type having a plurality of longitudinally spaced driving wheels, comprising in combination, a continuous driving shaft common to all the driven wheels of the vehicle and mounted in a rigid continuous supporting member which comprises the frame of the vehicle, oscillating half-axles attached to said supporting member, each half-axle bearing a driven wheel of the vehicle, and gears for directly driving the half-axles by the common shaft.

2. In a motor vehicle of the type having a plurality of longitudinally spaced rear driving wheels, comprising in combination, a continuous driving shaft common to all the driven wheels of the vehicle and mounted in a rigid continuous medial supporting member which forms the frame of the vehicle, oscillating half-axles attached to said medial supporting member, each half-axle bearing a driven wheel of the vehicle, and gears for directly driving the half-axles by the common shaft.

3. In a motor vehicle of the type having a plurality of driving axles, in combination, an engine casing, a driving shaft housing, and a truck for supporting a plurality of longitudinally spaced driving wheels, said casing, housing and truck being rigidly connected to constitute the vehicle frame, a continuous driving shaft extending through and longitudinally of said vehicle frame, a plurality of half-axles pivotally supported upon said vehicle frame for independent motion, and gearing directly connecting each of said half-axles with said driving shaft.

4. In a motor vehicle having two or more pairs of driven rear wheels and a common prolonged driving shaft for driving said wheels: a medial supporting member prolonged as a rigid body behind the first pair of wheels, a further pair or further pairs of wheels, arranged behind the first pair of wheels, each wheel arranged on a swivelling or oscillating half-axle attached to the rigid body of the medial supporting member, a jointless prolongation of the driving shaft mounted in the rigid body of the medial supporting member and gears for transmitting the drive from the driving shaft to the wheels, a coupling joint terminating the common driving shaft and a coupling joint terminating the medial supporting member, the axes of rotation of both coupling joints being co-axial with each other, a bogie or trailer, a medial supporting member on said bogie or trailer, two or more pairs of oscillating or swivelling half-axles bearing wheels, arranged one pair behind the other and attached to said medial supporting member, gear for driving the wheels by the driving shaft mounted in said supporting member, a coupling joint terminating the medial supporting member of the bogie or trailer to coact with the coupling joint of the supporting member of the motor vehicle and a coupling joint terminating the driving shaft of the bogie or trailer to coact with the coupling joint of the driving shaft of the motor vehicle.

HANS LEDWINKA.